US008135043B2

United States Patent
Ogura

(10) Patent No.: US 8,135,043 B2
(45) Date of Patent: Mar. 13, 2012

(54) MOBILE COMMUNICATION SYSTEM, CORE NETWORK APPARATUS, AND MBMS DATA TRANSMISSION METHOD USED FOR THE SAME

(75) Inventor: Daisuke Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 1101 days.

(21) Appl. No.: 11/877,401

(22) Filed: Oct. 23, 2007

(65) Prior Publication Data

US 2008/0101282 A1 May 1, 2008

(30) Foreign Application Priority Data

Oct. 25, 2006 (JP) ................................ 2006-289330

(51) Int. Cl.
*H04J 3/06* (2006.01)
*H04L 12/28* (2006.01)
(52) U.S. Cl. ....................................... 370/519; 370/390
(58) Field of Classification Search .................. 370/328, 370/329, 350, 503, 507, 352, 390, 330, 331, 370/332, 252; 705/10, 1, 27; 345/327
See application file for complete search history.

(56) References Cited

U.S. PATENT DOCUMENTS

| | | | |
|---|---|---|---|
| 6,134,531 A * | 10/2000 | Trewitt et al. ............... | 705/10 |
| 6,493,539 B1 | 12/2002 | Falco et al. | |
| 7,283,815 B2 | 10/2007 | Kim et al. | |
| 7,317,923 B2 * | 1/2008 | Koshino et al. ............. | 455/455 |
| 7,711,008 B2 * | 5/2010 | Jones et al. ................. | 370/503 |
| 7,742,765 B2 * | 6/2010 | Israelsson et al. .......... | 455/436 |
| 7,848,269 B2 * | 12/2010 | Tamura et al. .......... | 370/310.2 |
| 2004/0008646 A1 | 1/2004 | Park et al. | |
| 2004/0152453 A1 | 8/2004 | Hayashi | |
| 2005/0094618 A1 | 5/2005 | Colban et al. | |
| 2006/0146745 A1 * | 7/2006 | Cai et al. ..................... | 370/328 |
| 2007/0171853 A1 * | 7/2007 | Jones et al. ................. | 370/328 |
| 2008/0084837 A1 * | 4/2008 | Watanabe et al. ........... | 370/312 |

(Continued)

FOREIGN PATENT DOCUMENTS

JP 2001-069559 A 3/2001

(Continued)

OTHER PUBLICATIONS

Alcatel et al., 3GPP TSG-RAN WG 3 Meeting #53bis, R3-061583, "Text Proposal Architecture for Content Synchronisation", 7.3.2 Content Synchronisation, XP050160466, pp. 1-7 (2006).

(Continued)

*Primary Examiner* — Hanh Nguyen
(74) *Attorney, Agent, or Firm* — Dickstein Shapiro LLP

(57) ABSTRACT

A mobile communication system according to an exemplary aspect of the invention is a mobile communication system which includes eNBs (Evolved Universal Terrestrial Radio Access Network (E-UTRAN) NodeBs) and a core network apparatus, wherein the core network apparatus is provided as a Network Time Protocol (NTP) server and supplies clocks to the eNBs which are NTP clients; and the core network apparatus includes: an acquisition unit for acquiring transmission link delay information between the core network apparatus and each of the eNBs by periodically performing synchronization processing to each of the eNBs; a determination unit for determining a time of transmission based on the transmission link delay information acquired by the acquisition unit; and a unit for copying Multimedia Broadcast Multicast Service (MBMS) data as many as the eNBs, adding time information determined by the determination unit to each of copied MBMS data and transmitting the MBMS data to each of the eNBs.

8 Claims, 7 Drawing Sheets

U.S. PATENT DOCUMENTS

2008/0089265 A1    4/2008    Park et al.

FOREIGN PATENT DOCUMENTS

| JP | 2003-348643 A | 12/2003 |
| JP | 2004-229117   | 8/2004  |
| JP | 2007-525914 A | 9/2007  |
| JP | 2008-099291 A | 4/2008  |
| KR | 2005-0092281 A | 9/2005 |

OTHER PUBLICATIONS

NEC: "Node Synchronisation for eMBMS purpose", RAN Working Group 3 meeting #53, R3#53(06)1095, pp. 1-2 (2006).

3GPP TS 25.346 V6.5.0, "3rd Generation Partnership Project; Technical Specification Group Radio Access Network; Introduction of the Multimedia Broadcast Multicast Service (MBMS) in the Radio Access Network (RAN); Stage 2 (Release 6)", Jun. 2005.

* cited by examiner

MOBILE COMMUNICATION SYSTEM, CORE NETWORK APPARATUS, AND MBMS DATA TRANSMISSION METHOD USED FOR THE SAME

INCORPORATION BY REFERENCE

This application is based upon and claims the benefit of priority from Japanese patent application No. 2006-289330, filed on Oct. 25, 2006, the disclosure of which is incorporated herein in its entirety by reference.

BACKGROUND OF THE INVENTION

1. Field of the Invention

The present invention relates to a mobile communication system, a core network apparatus, and an MBMS data transmission method used for them, and more particularly, to a method for transmitting Multimedia Broadcast Multicast Service (MBMS) data in an Evolved Universal Terrestrial Radio Access Network (E-UTRAN).

2. Description of the Related Art

In Release 7 and onwards of the Third Generation Partnership Project (3GPP) standardization, a next-generation network is now under consideration as Long Term Evolution (LTE)/System Architecture Evolution (SAE).

The 3GPP Release 6 has defined a feature called MBMS which is intended for distribution of video, picture, and/or music data (see "Introduction of the Multimedia Broadcast Multicast Service (MBMS) in the Radio Access Network (RAN); Stage 2 (Release 6)" (3GPP TS25.346 V6.5.0 (2005-06)), for example), and the way of realizing the feature in the system based on Release 7 and onwards is being discussed.

However, in the E-UTRAN system configuration which has been incorporated as a requirement from Release 7 and onwards, a Radio Network Controller (RNC) is integrated with a NodeB (a radio base station) to become an eNB (E-UTRAN NodeB), and an interface with a core network apparatus (User Plane Entity (UPE)/Mobility Management Entity (MME)) is an Internet Protocol (IP) network. For these reasons, it has not been specifically defined how to absorb delay or fluctuation on a transmission link, a point at which MBMS data from a Broadcast Multicast-Service Centre (BM-SC) is copied and transmitted on a cell basis, and/or how to synchronize data transmitted by eNBs when User Equipment (UE) moves across cells of different eNBs.

An MBMS service in a network configuration of a related art is conceptually illustrated in FIG. 7. As shown in FIG. 7, synchronization processing is performed between an RNC 7 and NodeBs (#1, #2) 6-1, 6-2. From this synchronization, the RNC 7 recognizes delay on transmission links to the NodeBs (#1, #2) 6-1 and 6-2, and performs processing for copying MBMS data which is received from the BM-SC 5 via a GGSN (Gateway GPRS (General Packet Radio Service) Support Node) 9 and an SGSN (Serving GPRS Support Node) 8 on a cell basis and transmitting the MBMS data to UEs (#1, #2) 1-1 and 1-2 via the NodeBs (#1, #2) 6-1 and 6-2.

Techniques for multicast transmission in a network configuration of a related art include the one described in Japanese Patent Laid-Open No. 2004-229117.

While E-UTRAN is currently under consideration, when an MBMS service is to be realized in the current system, the NodeB and the RNC is synchronized with each other, and the RNC performs data copying processing in consideration of the cells of the NodeB.

In the E-UTRAN, on the other hand, the functions of the RNC and those of the NodeB are integrated and defined as an eNB. Consequently, there are a problem that a point for copying MBMS data when an MBMS service is realized is not specifically defined, and a problem that the way of synchronization is not defined though it is necessary to synchronize MBMS data transmitted by eNBs into Air (or a wireless space) in order to realize a seamless service when UE moves across cells of the eNBs. These problems cannot be solved even with the technique described in Japanese Patent Laid-Open No. 2004-229117.

BRIEF SUMMARY OF THE INVENTION

It is an exemplary object of the present invention to provide a mobile communication system that can specifically define the means of realizing an MBMS service in an E-UTRAN and realize seamless data reception on a UE, as well as a core network apparatus, and an MBMS data transmission method used for them.

A mobile communication system according to an exemplary aspect of the invention is a mobile communication system which includes eNBs (Evolved Universal Terrestrial Radio Access Network (E-UTRAN) NodeBs) which are configured by integrating functions of a radio network controller and functions of a radio base station, and a core network apparatus, wherein the core network apparatus is provided as a Network Time Protocol (NTP) server and supplies clocks to the eNBs which are NTP clients; and the core network apparatus includes: an acquisition unit for acquiring transmission link delay information between the core network apparatus and each of the eNBs by periodically performing synchronization processing to each of the eNBs; a determination unit for determining a time of transmission based on the transmission link delay information acquired by the acquisition unit; and a unit for copying Multimedia Broadcast Multicast Service (MBMS) data as many as the eNBs, adding time information determined by the determination unit to each of copied MBMS data and transmitting the MBMS data to each of the eNBs.

A core network apparatus according to an exemplary aspect of the invention is a core network apparatus in a mobile communication system which comprises eNBs (E-UTRAN (Evolved Universal Terrestrial Radio Access Network) NodeBs) which are configured by integrating functions of a radio network controller and functions of a radio base station, wherein the core network apparatus is provided as a Network Time Protocol (NTP) server and supplies clocks to the eNBs which are NTP clients; and the core network apparatus includes: an acquisition unit for acquiring transmission link delay information between the core network apparatus and each of the eNBs by periodically performing synchronization processing to each of the eNBs; a determination unit for determining a time of transmission based on the transmission link delay information acquired by the acquisition unit; and a unit for copying Multimedia Broadcast Multicast Service (MBMS) data as many as the eNBs, adding time information determined by the determination unit to each of copied MBMS data and transmitting the MBMS data to each of the eNBs.

An MBMS data transmission method according to an exemplary aspect of the invention is an MBMS (Multimedia Broadcast Multicast Service) data transmission method for use in a mobile communication system which includes eNBs (Evolved Universal Terrestrial Radio Access Network (E-UTRAN) NodeBs) which are configured by integrating functions of a radio network controller and functions of a radio base station, and a core network apparatus which is provided as an NTP (Network Time Protocol) server and supplies clocks to the eNBs which are NTP clients, including: acquiring transmission link delay information between the core network apparatus and each of the eNBs by periodically performing synchronization processing to each of the eNBs; determining a time of transmission based on the transmission link delay information; copying MBMS data as many as the eNBs; adding the determined time information to each of copied MBMS data; and transmitting the MBMS data to each of the eNBs.

A mobile communication system according to an exemplary aspect of the invention is a mobile communication system which includes eNBs (Evolved Universal Terrestrial Radio Access Network (E-UTRAN) NodeBs) which are configured by integrating functions of a radio network controller and functions of a radio base station, and a core network apparatus, wherein the core network apparatus is provided as a Network Time Protocol (NTP) server and supplies clocks to the eNBs which are NTP clients; and the core network apparatus includes:

acquisition means for acquiring transmission link delay information between the core network apparatus and each of the eNBs by periodically performing synchronization processing to each of the eNBs;

determination means for determining a time of transmission based on the transmission link delay information acquired by the acquisition means; and means for copying Multimedia Broadcast Multicast Service (MBMS) data as many as the eNBs, adding time information determined by the determination means to each of copied MBMS data and transmitting the MBMS data to each of the eNBs.

A core network apparatus according to an exemplary aspect of the invention is a core network apparatus in a mobile communication system which includes eNBs (E-UTRAN (Evolved Universal Terrestrial Radio Access Network) NodeBs) which are configured by integrating functions of a radio network controller and functions of a radio base station, wherein the core network apparatus is provided as a Network Time Protocol (NTP) server and supplies clocks to the eNBs which are NTP clients; and the core network apparatus includes:

acquisition means for acquiring transmission link delay information between the core network apparatus and each of the eNBs by periodically performing synchronization processing to each of the eNBs;

determination means for determining a time of transmission based on the transmission link delay information acquired by the acquisition means; and means for copying Multimedia Broadcast Multicast Service (MBMS) data as many as the eNBs, adding time information determined by the determination means to each of copied MBMS data and transmitting the MBMS data to each of the eNBs.

DETAILED DESCRIPTION OF THE EXEMPLARY EMBODIMENTS

Figure 1:
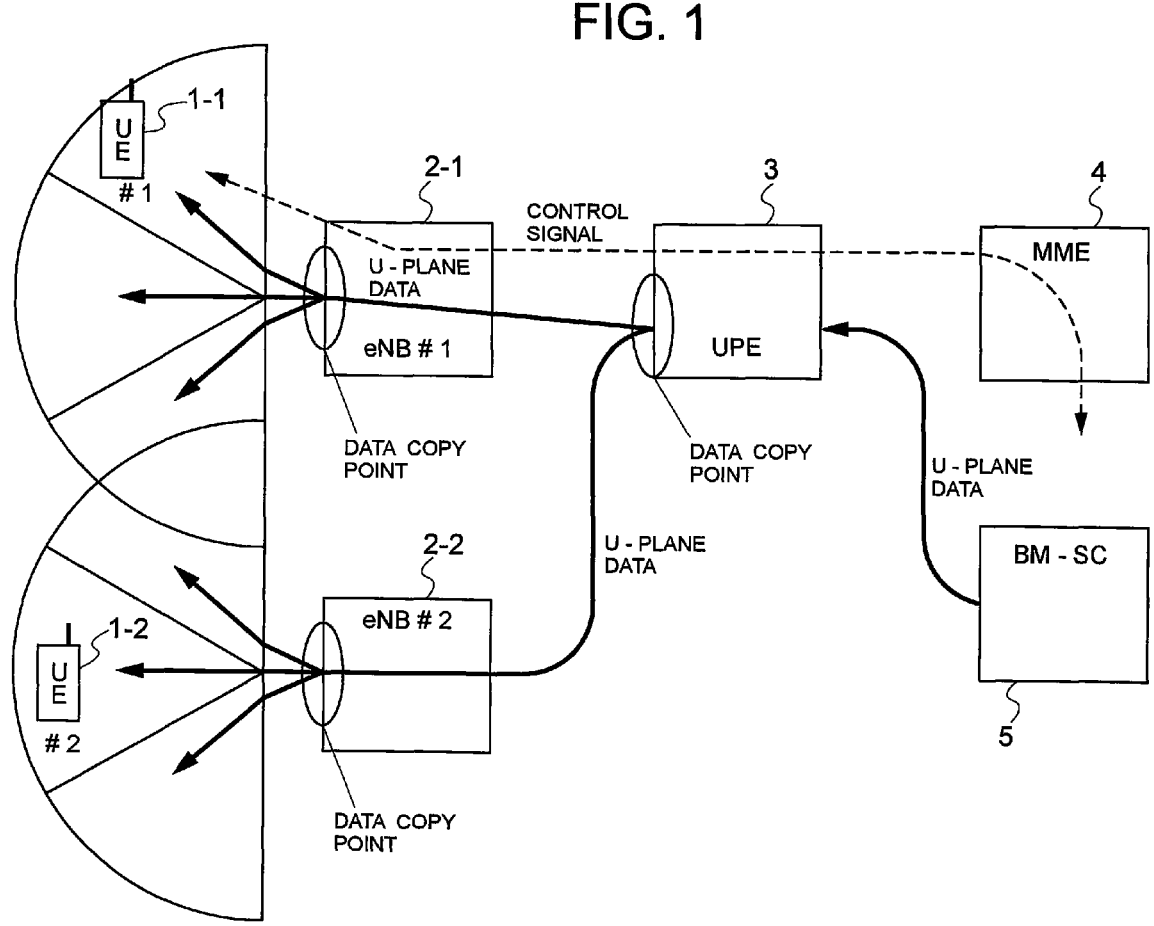
FIG. 1 is a block diagram showing the configuration of a mobile communication system according to an exemplary embodiment of the invention.

Next, exemplary embodiments of the invention will be described with reference to drawings. FIG. 1 is a block diagram showing the configuration of a mobile communication system according to a first exemplary embodiment of the invention. FIG. 1 illustrates a case where a UPE (User Plane Entity) copies MBMS (Multimedia Broadcast Multicast Service) data as many as eNBs (E-UTRAN NodeB) in an E-UTRAN (Evolved Universal Terrestrial Radio Access Network) configuration.

The mobile communication system according to the first exemplary embodiment of the invention includes an E-UTRAN configuration which includes UEs (User Equipment: mobile terminals) (#1, #2) 1-1 and 1-2, eNBs (#1, #2) 2-1 and 2-2 which are configured by integrating the functions of an RNC (Radio Network Controller) and those of a NodeB (a radio base station), a UPE 3, an MME (Mobility Management Entity) 4, and a BM-SC (Broadcast Multicast-Service Centre) 5.

Figure 2:
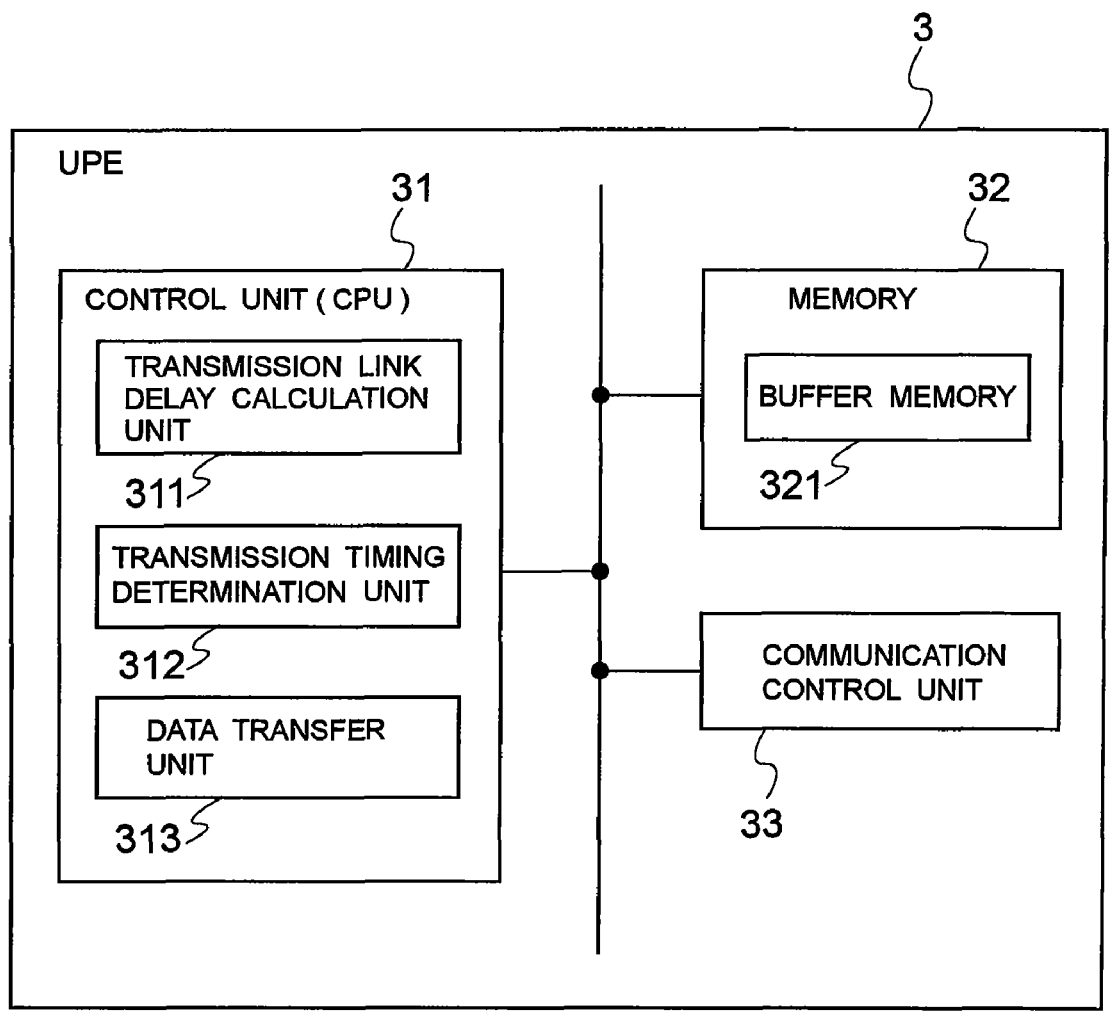
FIG. 2 is a block diagram showing an exemplary configuration of a UPE in FIG. 1.

FIG. 2 is a block diagram showing an exemplary configuration of the UPE 3 in FIG. 1. In FIG. 2, the UPE 3 includes a control unit (central processing unit or CPU) 31, a memory 32, and a communication control unit 33. The control unit 31 includes a transmission link delay calculation unit 311, a transmission timing determination unit 312, and a data transfer unit 313. The memory 32 includes an area as a buffer memory 321.

Processing performed by the transmission link delay calculation unit 311, transmission timing determination unit 312, and data transfer unit 313 is realized by the control unit 31 executing a program stored in the memory 32, and the units perform processing operations described below. In the buffer memory 321 of the memory 32, MBMS data from the BM-SC 5 is maintained. The buffer memory 321 may not be necessarily provided in the memory 32.

Figure 3:
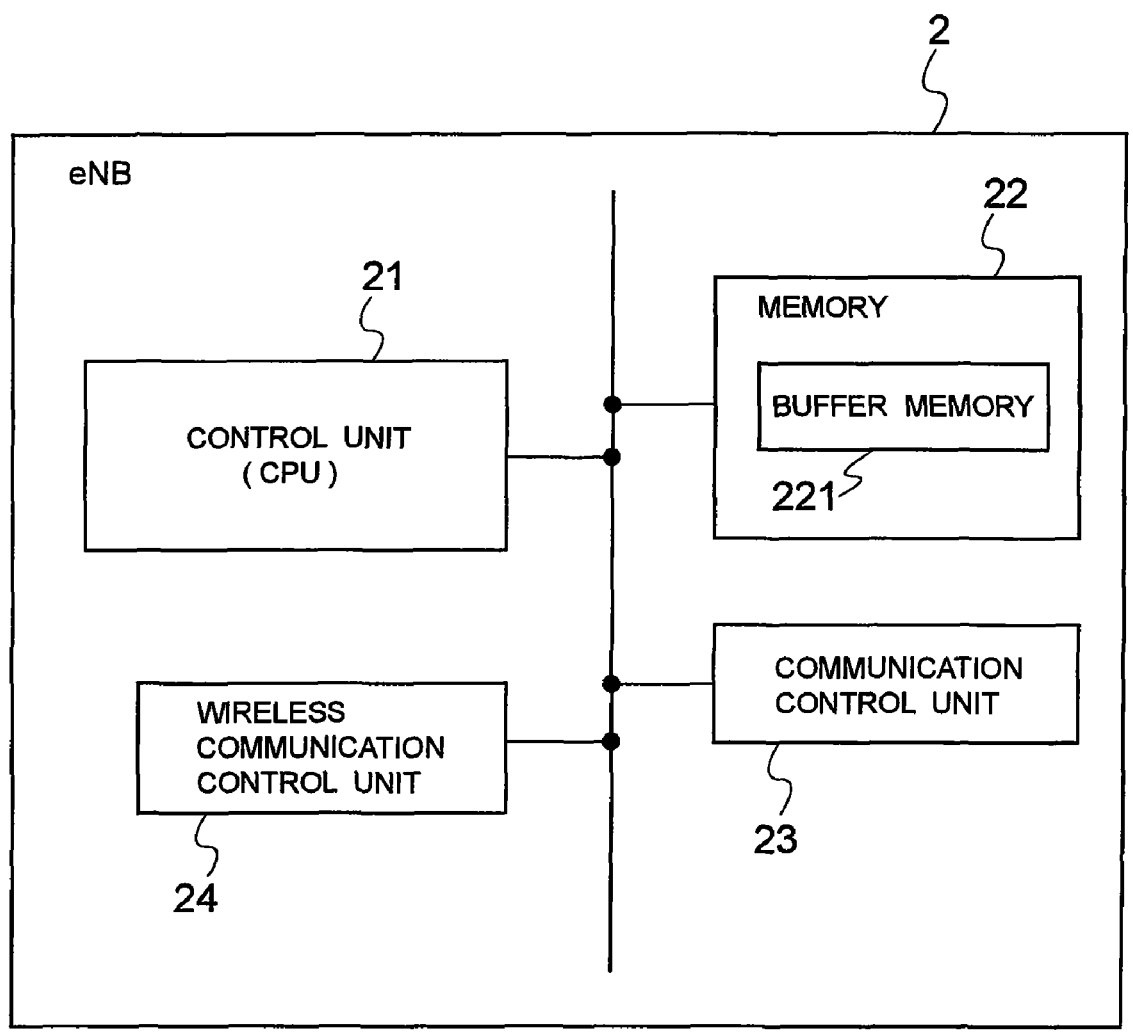
FIG. 3 is a block diagram showing an exemplary configuration of an eNB in FIG. 1.

FIG. 3 is a block diagram showing an exemplary configuration of the eNBs (#1, #2) 2-1 and 2-2 in FIG. 1. In FIG. 3, the eNB 2 (eNBs (#1,#2) 2-1, 2-2) includes a control unit (CPU) 21, a memory 22 in which an area as a buffer memory 221 is provided, a communication control unit 23 for controlling communication with the UPE 3, and a wireless communication control unit 24 for controlling wireless communication with the UEs (#1, #2) 1-1 and 1-2.

Figure 4:
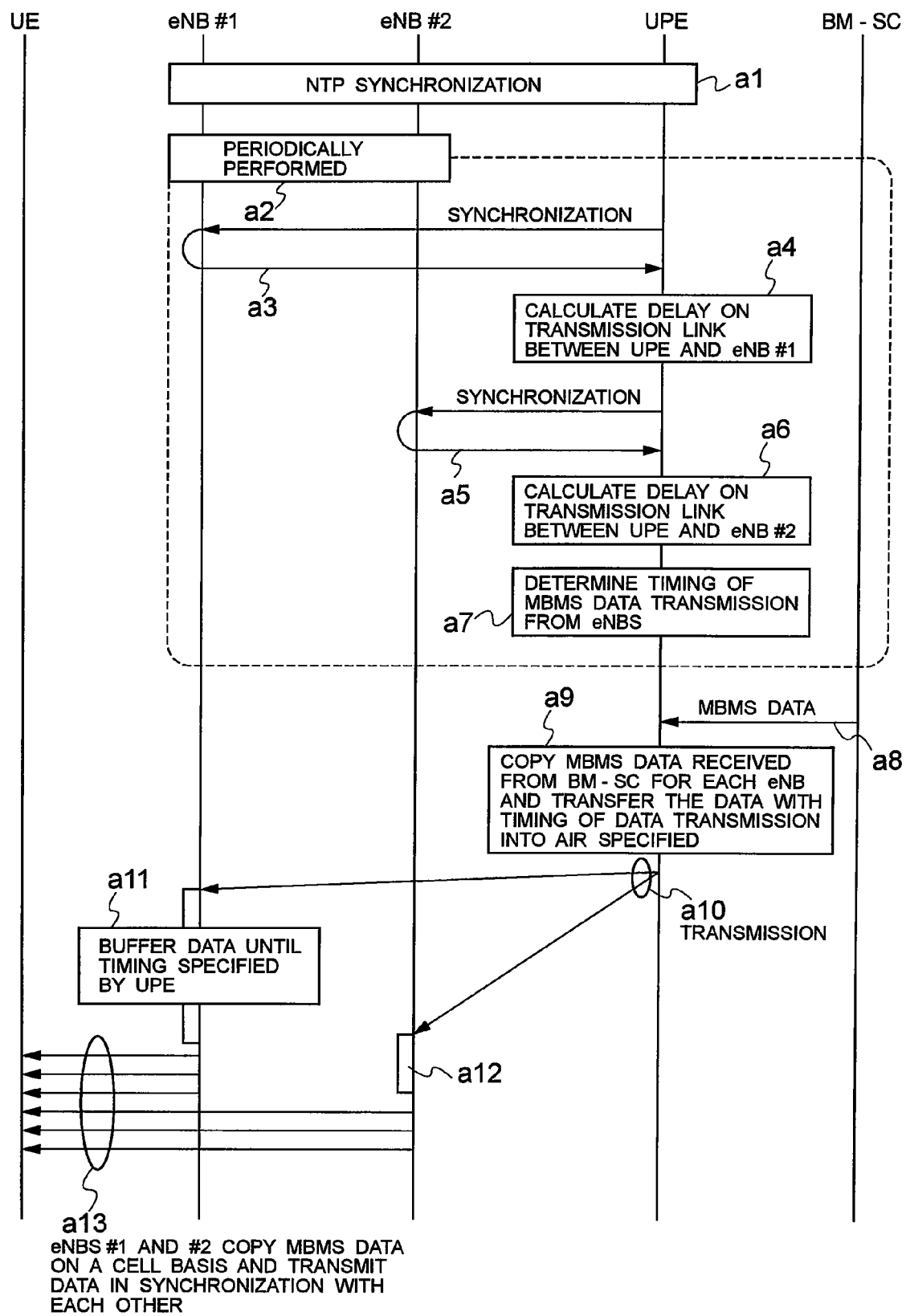
FIG. 4 is a sequence chart illustrating synchronization processing of MBMS data transmission timing under the condition shown in FIG. 1 according to the exemplary embodiment of the invention.

FIG. 4 is a sequence chart illustrating synchronization processing of MBMS data transmission timing under the condition shown in FIG. 1 according to the first exemplary embodiment of the invention. With reference to FIGS. 1 to 4, synchronization processing of MBMS data transmission timing under the condition of FIG. 1 according to the first exemplary embodiment of the invention will be described.

In the E-UTRAN system according to the first exemplary embodiment, MBMS data is copied on an eNB basis at the UPE 3, and on a cell basis at the eNBs (#1, #2) 2-1 and 2-2.

When MBMS data copy points are the UPE 3 (on an eNB basis) and the eNBs (#1, #2) 2-1 and 2-2 (on a cell basis), the data transfer unit 313 of the UPE 3 performs processing of copying and transmitting MBMS data as many as the eNBs (#1, #2) 2-1 and 2-2 which are under the management of the UPE 3 (see a9 and a10 in FIG. 4).

In this situation, the UPE 3 performs synchronization processing to each of the eNBs (#1, #2) 2-1 and 2-2 to grasp delay on transmission links in order to consider the timing of transmission into Air (wireless space) from the eNBs (#1, #2) 2-1 and 2-2 which are managed by the UPE 3, and adds time information to data for synchronizing timing of transmission into Air. This enables cell combining on the UEs (#1, #2) 1-1 and 1-2 even when the UEs move across cells of the different eNBs (#1, #2) 2-1 and 2-2.

Time synchronization between the eNBs (#1, #2) 2-1 and 2-2, which is required for adjusting the timing of MBMS data transmission, is realized by providing the UPE 3 as a Network Time Protocol (NTP) server and the eNBs (#1, #2) 2-1 and 2-2 as NTP clients.

FIG. 4 is the sequence chart illustrating synchronization processing of MBMS data transmission timing under the condition shown in FIG. 1. In the first exemplary embodiment, time synchronization between the eNBs (#1, #2) 2-1, 2-2 and the UPE 3 is achieved (a1 in FIG. 4) by providing the UPE 3 as an NTP server and the eNBs (#1, #2) 2-1 and 2-2, which are managed by the UPE 3, as NTP clients.

In the first exemplary embodiment, synchronization is periodically performed from the UPE 3 to each of the eNBs (#1, #2) 2-1 and 2-2 (a3 and a5 in FIG. 4) so that the transmission link delay calculation unit 311 grasps delay on IP (Internet Protocol) transmission link between the UPE 3 and each of the eNBs (#1, #2) 2-1 and 2-2 (a4 and a6 in FIG. 4).

From the values of transmission link delay determined by the transmission link delay calculation unit 311, the transmission timing determination unit 312 of the UPE 3 calculates the timing of data transmission into Air in consideration of in-device delay in the eNBs and the value of transmission link delay for an eNB that has the largest delay (a7 in FIG. 4).

The data transfer unit 313 of the UPE 3 copies MBMS data from the BM-SC 5 for each of the eNBs (#1, #2) 2-1 and 2-2 which are managed by the UPE 3, and adds the value of the transmission timing into Air calculated by the transmission timing determination unit 312 to the MBMS data and transmits the data through the communication control unit 33 (a9 and a10 in FIG. 4).

Upon receiving the MBMS data, each of the eNBs (#1, #2) 2-1 and 2-2 buffers the data until the transmission timing specified in the received data (a11 in FIG. 4), and then transmits the data into Air so as to realize MBMS data transmission synchronized between the eNBs (#1, #2) 2-1 and 2-2 (a12 and a13 in FIG. 4). This enables cell combining on the UEs (#1, #2) 1-1 and 1-2 when the UEs move across cells of the different eNBs (#1, #2) 2-1 and 2-2.

Figure 5:
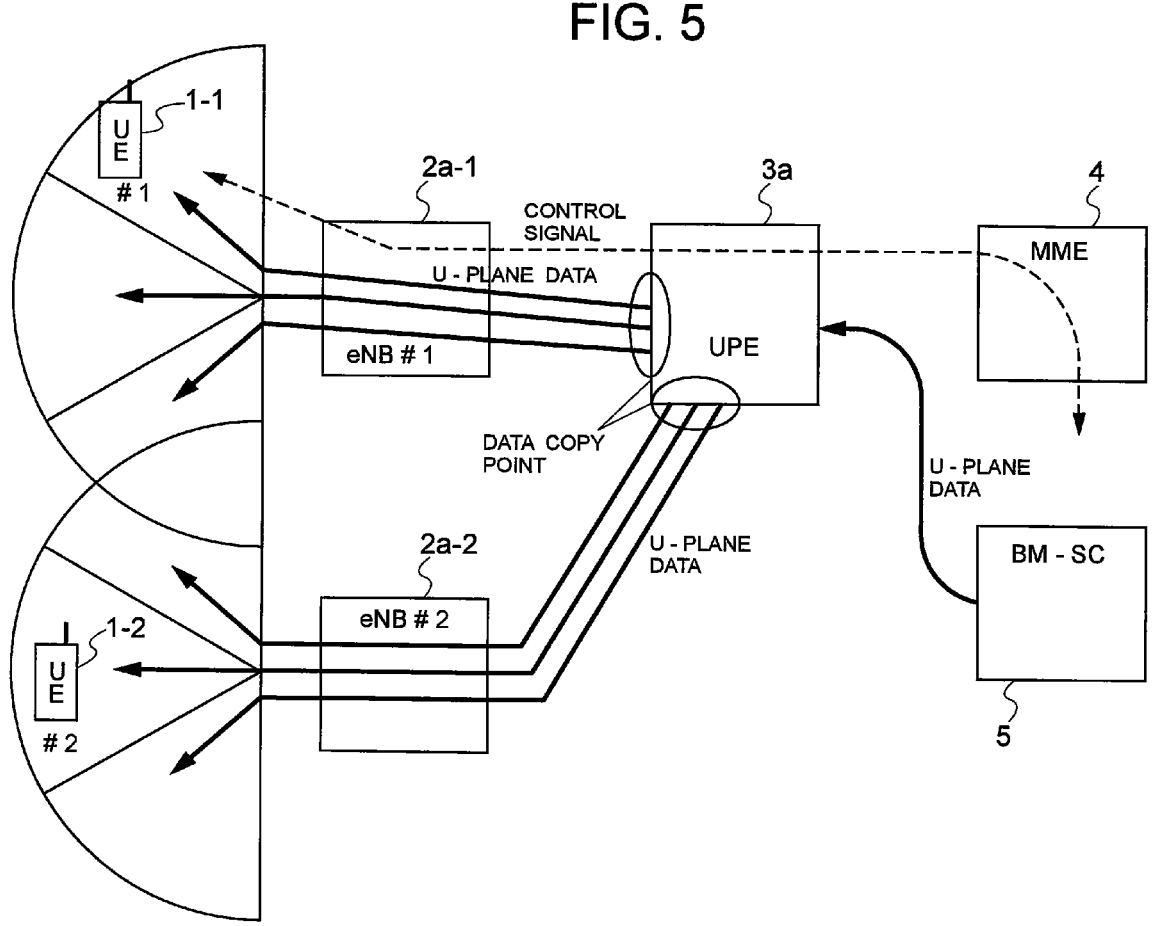
FIG. 5 illustrates a case where MBMS data is copied at the UPE on a cell basis in the E-UTRAN system according to an exemplary embodiment of the invention.

FIG. 5 illustrates a case where MBMS data is copied at a UPE 3a on a cell basis in an E-UTRAN system according to a second exemplary embodiment of the invention. The UPE 3a and eNBs (#1, #2) 2a-1, 2a-2 have similar configurations to the ones according to the first exemplary embodiment of the invention shown in FIGS. 2 and 3 described above.

When the MBMS data copy point is the UPE 3a (on a cell basis), the UPE 3a is aware of the cells of the eNBs (#1, #2) 2a-1 and 2a-2 which are under the management of the UPE 3a, and the data transfer unit 313 of the UPE 3a performs processing for copying and transmitting MBMS data.

In this situation, the UPE 3a performs synchronization processing to each of the eNBs (#1, #2) 2a-1 and 2a-2 to grasp transmission link delay in order to consider the timing of data transmission into Air from the eNBs (#1, #2) 2a-1 and 2a-2, which are under the management of the UPE 3a, and buffers MBMS data for the eNBs (#1, #2) 2a-1 and 2a-2 so as to adjust the timing of data transmission into Air.

Figure 6:
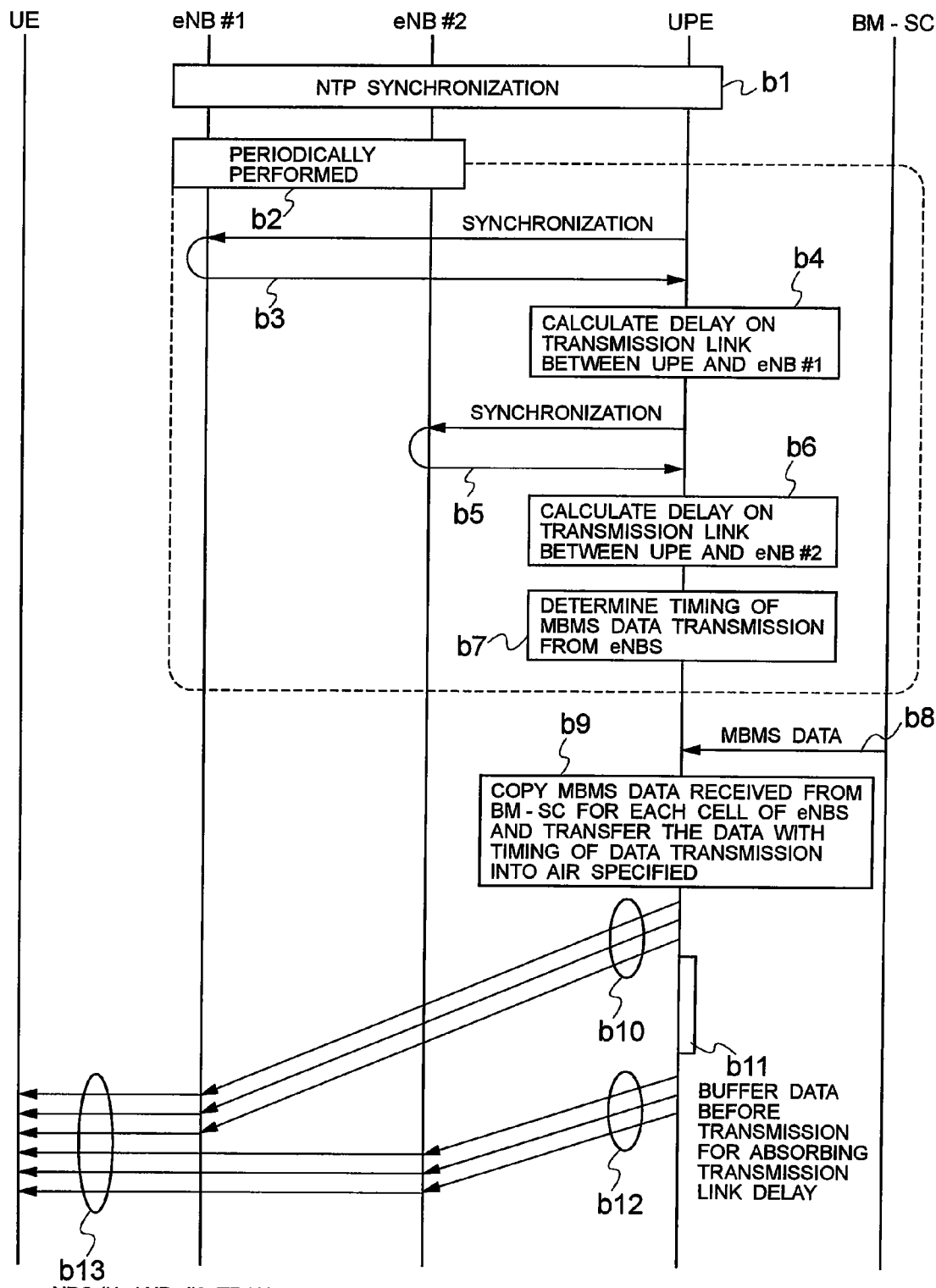
FIG. 6 is a sequence chart illustrating synchronization processing of MBMS data transmission timing under the condition shown in FIG. 5.
Figure 7:
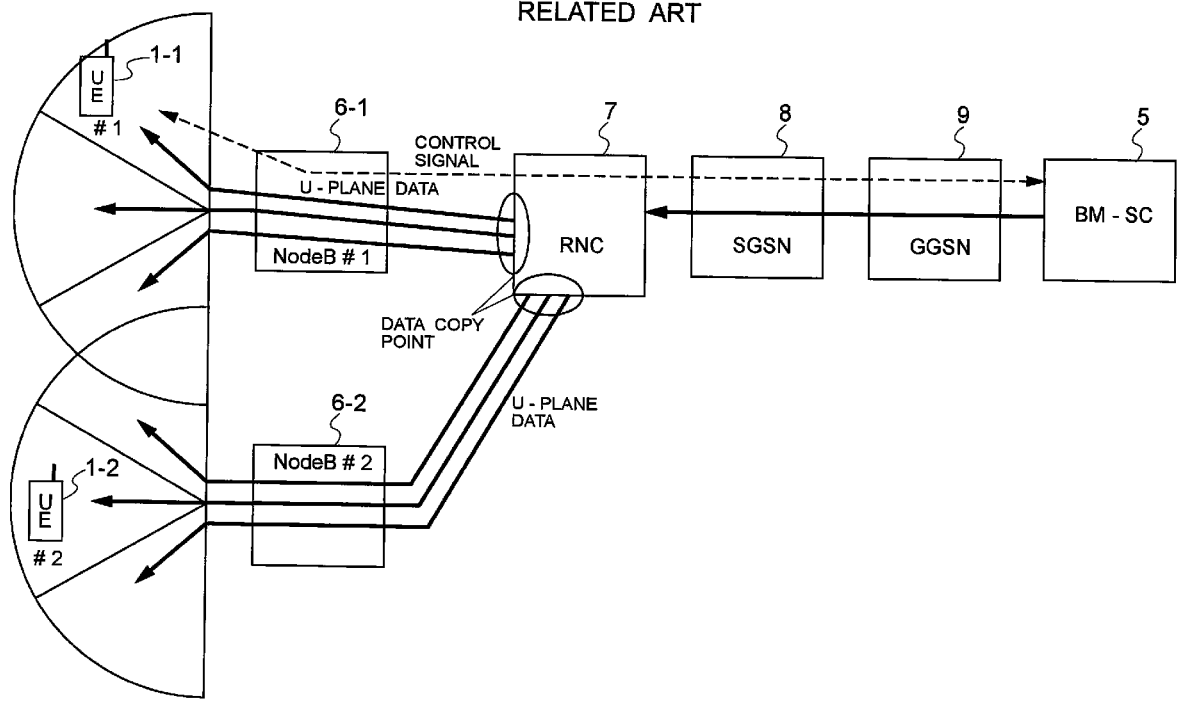
FIG. 7 illustrates a 3GPP network configuration and an MBMS service of a related art.

FIG. 6 is a sequence chart illustrating synchronization processing of MBMS data transmission timing under the condition shown in FIG. 5. Referring to FIGS. 2, 3, 5 and 6, synchronization processing of MBMS data transmission timing under the condition shown in FIG. 5 according to the second exemplary embodiment of the invention will be described.

By providing the UPE 3a as an NTP server and the eNBs (#1, #2) 2a-1 and 2a-2, which are managed by the UPE 3a, as NTP clients, time synchronization is achieved between the eNBs (#1, #2) 2a-1, 2a-2 and the UPE 3a (b1 in FIG. 6).

In the second exemplary embodiment, the transmission link delay calculation unit 311 of the UPE 3a periodically performs synchronization to each of the eNBs (#1, #2) 2a-1 and 2a-2 (b3 and b5 in FIG. 6) to grasp delay on IP transmission link between the UPE 3a and each of the eNBs (#1, #2) 2a-1 and 2a-2 (b4 and b6 in FIG. 6). From the values of transmission link delay determined by the transmission link delay calculation unit 311, the transmission timing determination unit 312 of the UPE 3a calculates the timing of data transmission into Air in consideration of in-device delay in the eNBs and the value of transmission link delay for an eNB that has the largest delay (b7 in FIG. 6).

The data transfer unit 313 copies MBMS data from the BM-SC 5 for each cell of eNBs which are under the management of the UPE 3a (b8 and b9 in FIG. 6), and the communication control unit 33 adjusts the transmission timing of data to be transmitted to the eNBs (#1, #2) 2a-1 and 2a-2 (on a cell basis) in consideration of the timing of data transmission into Air calculated by the transmission timing determination unit 312 (b10 through b12 in FIG. 6). The eNBs (#1, #2) 2a-1 and 2a-2 transmit the data received from the UPE 3a into Air as it is without applying particular processing to the data (b13 in FIG. 6).

In the description above, the UPE 3a copies MBMS data on a cell basis, that is, the UPE 3a copies MBMS data as many as the cells of eNBs which are under the management of the UPE 3a at b9 of FIG. 6. However, the UPE 3a may copy MBMS data on an eNB basis. In that case, each of the eNBs (#1, #2) 2a-1 and 2a-2 copies the MBMS data received from the UPE 3a on a cell basis and transmits the data into Air. The eNB (#1, #2) 2a-1 and 2a-2 may buffer the received data until the timing of data transmission into Air contained in the received data before transmitting the data into Air.

As has been described above, the first and second exemplary embodiments provide such effects as follows for realization of an MBMS service in the E-UTRAN configuration.

As the way of synchronization at the time of transmitting MBMS data into Air from the eNBs (#1, #2) 2-1 and 2-2 as well as 2a-1 and 2a-2, by providing the UPE 3 and 3a as an NTP server and the eNBs (#1, #2) 2-1 and 2-2 as well as 2a-1 and 2a-2 as NTP clients, the eNBs (#1, #2) 2-1 and 2-2 as well as 2a-1 and 2a-2 can share common time information.

In addition, in the first and second exemplary embodiments, when the UPE 3 or 3a is to transmit MBMS information, transmission link delay between the eNBs (#1, #2) 2-1, 2-2, or 2a-1, 2a-2 and the UPE 3 or 3a can be taken into consideration by performing synchronization to the eNBs (#1, #2) 2-1, 2-2, or 2a-1, 2a-2 in advance, and timing adjustment at the time of MBMS data transmission from the eNBs (#1, #2) 2-1 and 2-2, or 2a-1 and 2a-2 into Air can be realized.

Furthermore, as the way of MBMS data copying in an E-UTRAN in the first and second exemplary embodiments, the UPE 3 or 3a copies and transmits MBMS data either on an eNB basis or on a cell basis. This can realize cell combining processing when the UEs (#1, #2) 1-1 and 1-2 move across cells.

The UPE 3 or 3a may perform processing for setting non-simultaneous timing of transfer to the eNBs (#1, #2) 2-1 and 2-2, or 2a-1 and 2a-2 taking into consideration timing of data transmission into Air when the UPE 3 or 3a performs copying on an eNB basis.

The first and second exemplary embodiments may reduce load on the UPEs 3 and 3a and provide detailed MBMS services by assigning the function of copying and transferring MBMS data to the eNBs (#1, #2) 2-1 and 2-2 as well as 2a-1 and 2a-2 to an apparatus other than the UPEs 3 and 3a and having the UPEs 3 and 3a manage a limited number of eNBs.

As the way of synchronization between eNBs in the network configuration of E-UTRAN, a mobile communication system according to a third exemplary embodiment of the invention provides a UPE as an NTP server, which supplies clocks to the eNBs as NTP clients.

Then, the UPE periodically performs synchronization processing to each of the eNBs and decides a time of transmission into Air (i.e., a wireless space) based on transmission link delay information. When the UPE copies MBMS data as many as the eNBs, the UPE sets time information for the eNBs to transmit MBMS data into Air so that the eNBs transmits the data at the same timing, which provides a UE with stable data transmission without instantaneous interruption.

Thus, the mobile communication system according to the third exemplary embodiment of the present invention can provide an effect of enabling the eNBs to share common time information for realization of an MBMS service in the E-UTRAN.

In addition, in the mobile communication system according to the third exemplary embodiment of the invention, when the UPE is to transmit MBMS data, the UPE performs synchronization processing to each of the eNBs in advance to consider transmission link delay between the eNBs and the UPE, which can realize the adjustment of timing for the eNBs to transmit MBMS data into Air.

Furthermore, in the mobile communication system according to the third exemplary embodiment of the invention, cell combining processing at the time of the UE's movement across cells can be realized by the UPE copying and transmitting MBMS data on an eNB basis or on a cell basis.

An exemplary advantage according to the invention is that an MBMS service can be realized in an E-UTRAN to realize seamless data reception on a UE.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile communication system which comprises eNBs (Evolved Universal Terrestrial Radio Access Network (E-UTRAN) NodeBs) which are configured by integrating functions of a radio network controller and functions of a radio base station, and a core network apparatus, wherein the core network apparatus is provided as a Network Time Protocol (NTP) server and supplies clocks to the eNBs which are NTP clients; and the core network apparatus comprises:

an acquisition unit for acquiring transmission link delay information between the core network apparatus and each of the eNBs by periodically performing synchronization processing to each of the eNBs;

a determination unit for determining a time of transmission based on the transmission link delay information acquired by the acquisition unit; and a unit for copying Multimedia Broadcast Multicast Service (MBMS) data as many as the eNBs, adding time information determined by the determination unit to each of copied MBMS data and transmitting the MBMS data to each of the eNBs, wherein the core network apparatus is a User Plane Entity (UPE).

2. The mobile communication system according to claim 1, wherein the core network apparatus copies and transmits the MBMS data either on an eNB basis or on a cell basis.

3. A core network apparatus in a mobile communication system which comprises eNBs (E-UTRAN (Evolved Universal Terrestrial Radio Access Network) NodeBs) which are configured by integrating functions of a radio network controller and functions of a radio base station, wherein the core network apparatus is provided as a Network Time Protocol (NTP) server and supplies clocks to the eNBs which are NTP clients; and the core network apparatus comprises:

an acquisition unit for acquiring transmission link delay information between the core network apparatus and each of the eNBs by periodically performing synchronization processing to each of the eNBs;

a determination unit for determining a time of transmission based on the transmission link delay information acquired by the acquisition unit; and a unit for copying Multimedia Broadcast Multicast Service (MBMS) data as many as the eNBs, adding time information determined by the determination unit to each of copied MBMS data and transmitting the MBMS data to each of the eNBs, wherein the core network apparatus is a User Plane Entity (UPE).

4. The core network apparatus according to claim 3, wherein the core network apparatus copies and transmits the MBMS data either on an eNB basis or on a cell basis.

5. An MBMS (Multimedia Broadcast Multicast Service) data transmission method for use in a mobile communication system which comprises eNBs (Evolved Universal Terrestrial Radio Access Network (E-UTRAN) NodeBs) which are configured by integrating functions of a radio network controller and functions of a radio base station, and a core network apparatus which is provided as an NTP (Network Time Protocol) server and supplies clocks to the eNBs which are NTP clients, comprising:

acquiring transmission link delay information between the core network apparatus and each of the eNBs by periodically performing synchronization processing to each of the eNBs;

determining a time of transmission based on the transmission link delay information;

copying MBMS data as many as the eNBs;

adding the determined time information to each of copied MBMS data; and transmitting the MBMS data to each of the eNBs, wherein the core network apparatus is a User Plane Entity (UPE).

6. The MBMS data transmission method according to claim 5, wherein the core network apparatus copies and transmits the MBMS data either on an eNB basis or on a cell basis.

7. A mobile communication system which comprises eNBs (Evolved Universal Terrestrial Radio Access Network (E-UTRAN) NodeBs) which are configured by integrating functions of a radio network controller and functions of a radio base station, and a core network apparatus, wherein
the core network apparatus is provided as a Network Time Protocol (NTP) server and supplies clocks to the eNBs which are NTP clients; and
the core network apparatus comprises:
acquisition means for acquiring transmission link delay information between the core network apparatus and each of the eNBs by periodically performing synchronization processing to each of the eNBs;
determination means for determining a time of transmission based on the transmission link delay information acquired by the acquisition means; and
means for copying Multimedia Broadcast Multicast Service (MBMS) data as many as the eNBs, adding time information determined by the determination means to each of copied MBMS data and transmitting the MBMS data to each of the eNBs,
wherein the core network apparatus is a User Plane Entity (UPE).

8. A core network apparatus in a mobile communication system which comprises eNBs (E-UTRAN (Evolved Universal Terrestrial Radio Access Network) NodeBs) which are configured by integrating functions of a radio network controller and functions of a radio base station, wherein
the core network apparatus is provided as a Network Time Protocol (NTP) server and supplies clocks to the eNBs which are NTP clients; and
the core network apparatus comprises:
acquisition means for acquiring transmission link delay information between the core network apparatus and each of the eNBs by periodically performing synchronization processing to each of the eNBs;
determination means for determining a time of transmission based on the transmission link delay information acquired by the acquisition means; and
means for copying Multimedia Broadcast Multicast Service (MBMS) data as many as the eNBs, adding time information determined by the determination means to each of copied MBMS data and transmitting the MBMS data to each of the eNBs,
wherein the core network apparatus is a User Plane Entity (UPE).

* * * * *